United States Patent [19]

Abraham

[11] 4,362,794

[45] Dec. 7, 1982

[54] ELECTROLYTE

[75] Inventor: Kuzhikalail M. Abraham, Needham Heights, Mass.

[73] Assignee: EIC Corporation, Newton, Mass.

[21] Appl. No.: 193,118

[22] Filed: Oct. 2, 1980

[51] Int. Cl.$^3$ ............................................. H01M 6/14
[52] U.S. Cl. ................................... 429/196; 429/101; 429/199
[58] Field of Search ................ 429/196, 194, 101, 199

[56] References Cited

U.S. PATENT DOCUMENTS

| | | | |
|---|---|---|---|
| 4,117,329 | 12/1979 | Dey et al. | 429/101 |
| 4,139,681 | 2/1979 | Klemann | 429/194 X |
| 4,219,443 | 8/1980 | Klinedinst et al. | 429/196 X |
| 4,238,552 | 12/1980 | Dey et al. | 429/196 X |

OTHER PUBLICATIONS

A. N. Dey and J. Miller, *J. Electrochem. Soc.,* 126, 1445 (1979).

J. P. Gano and D. Lenfant, "Proceedings of the Symposium on Battery Design and Optimization," *The Electrochemical Society,* V 79-1, 348 (1979).

*Primary Examiner*—Charles F. LeFevour

[57] ABSTRACT

Compound having the formula $MZSX_2$, wherein M is an alkali metal, Z is selected from the group consisting of boron, aluminum, gallium, indium, and thallium, and X is a halogen.

5 Claims, No Drawings

ELECTROLYTE

FIELD OF THE INVENTION

This invention pertains to electrolyte compositions having the properties of a conductive fluid and a cathode depolarizer for non-aqueous electrochemical cells, to methods of preparing the electrolyte compositions, and to electrochemical cells utilizing these electrolyte compositions. More specifically, the invention pertains to electrolyte compositions derived from reactions between an alkali metal sulfide, (for example, lithium sulfide ($Li_2S$)), and a Lewis acid halide, (for example, aluminum chloride ($AlCl_3$)), in a fluid inorganic oxyhalide, (for example, thionyl chloride ($SOCl_2$)), and from reactions between an alkali metal halide, (for example, lithium chloride) and a Lewis acid metal sulfur halide, (for example, aluminum sulfur chloride ($AlSCl$)), in a fluid inorganic oxyhalide, to methods of preparing such electrolyte compositions, and to electrochemical cells (for example, lithium metal anode cells) utilizing such electrolyte compositions.

BACKGROUND OF THE INVENTION

An electrochemical cell employing lithium as the anode active metal and thionyl chloride ($SOCl_2$) as both the electrolyte solvent and the liquid cathode and lithium tetrachloro aluminate ($LiAlCl_4$) as the electrolyte salt has been known as a potential power source for consumer applications such as pacemakers, electronic devices, and watches, and for many military applications such as missiles and torpedoes. The attractiveness of this electrochemical cell results from its high cell voltage, usually between 3 V and 3.6 V depending upon the power drain rate, and its high energy density, up to 300 watt-hours per pound in D-size cells.

The choice of the electrolyte salt in the aforementioned cell is an important criterion for its acceptable performance. Generally speaking, the electrolyte salt helps impart conductivity to the electrolyte and maintain proper $Li^+$ ion transport in the cell during cell discharge. An important drawback of the cell when it contains $LiAlCl_4$ as the electrolyte salt is that the cell exhibits an unacceptable voltage depression to less than 2.0 V after storage for extended periods of time, especially at elevated temperatures. This voltage depression, known in the art as voltage delay, is caused by an insulating film which forms on the Li anode in a continuous manner with storage.

The role of the electrolyte salt in controlling the growth of the insulating film is evidenced by prior work which shows varying degrees of lessening of the problems when $LiAlCl_4$ is replaced by other salts. In U.S. Pat. No. 4,020,240, lithium cloroborate ($Li_2B_{10}Cl_{10}$) was claimed as a substitute for $LiAlCl_4$ for alleviating voltage delay. Recent published work (A. N. Dey and J. Miller, J. Electrochem. Soc. 126, 1445 (1979)) on the performance of lithium-$SOCl_2$ cells which utilize $Li_2B_{10}Cl_{10}$ electrolyte salt and which were stored at 70° C. for extended periods of time, indicate some loss in cell capacity with storage as a result of electrolyte instability. Another prior work (J. P. Gabano and D. Lenfant in "Proceedings of the Symposium on Battery Design and Optimization," The Electrochemical Society, V 79-1, p. 348 (1979)) which claims alleviation of voltage delay in the aforementioned electrochemical cell utilizes an electrolyte composition derived from the direct reaction of 1 mole of $Li_2O$ and 2 moles of $AlCl_3$ in $SOCl_2$, such that the resulting solution has a 1 molar lithium ion concentration. In that publication it is claimed that the electrolyte salt is the complex, $2Li^+ [AlCl_3-O-AlCl_3]^{-2}$.

Because of the crucial role of the electrolyte composition and particularly that of the electrolyte salt in deciding the performance characteristics of the Li-anode-$SOCl_2$ electrochemical cell, novel and effective electrolyte compositions and/or electrolyte salts are desirable. In a recent patent (U.S. Pat. No. 4,117,329), salts of the general formula, $M(ZX_4)_n$, exemplified by $LiGaCl_4$, have been claimed as possible substitutes for $LiAlCl_4$.

SUMMARY OF THE INVENTION

It is a feature of the invention that the electrolyte compositions comprise novel electrolyte salts, represented by the general formula $MZSX_2$, where M is an alkali metal, Z is boron, aluminium, gallium, indium or thallium and X is a halogen; in a preferred embodiment the invention provides fluid electrolyte compositions in which the electrolyte salt is lithium aluminum sulfur dichloride ($LiAlSCL_2$) and the solvent is $SOCl_2$. In another preferred embodiment the invention provides a method of preparing a fluid electrolyte composition which comprises $SOCl_2$ and the salt $LiAlSCl_2$ as obtainable either in the reaction of one mole of $Li_2S$ and 1 mole of $AlCl_3$ in $SOCl_2$ or in the reaction of one mole of $LiCl$ and 1 mole of $AlSCl$. It is yet another feature of the invention that it provides a novel method of preparing an electrolyte composition which comprises $SOCl_2$ and a 1:1 molar mixture of $LiAlSCl_2$ and $LiAlCl_4$ as obtainable in the reaction of one mole of $Li_2S$ and 2 moles of $AlCl_3$ in $SOCl_2$. It is a feature of the invention that it provides novel electrolyte compositions which are sufficiently conductive and capable of serving both as fluid electrolytes and cathode depolarizers for an electrochemical cell which utilizes an active alkali metal anode, preferably lithium.

The present invention, in general, relates to novel electrolyte compositions which comprise inorganic fluid oxyhalides which are highly electropositive with respect to alkali metals so as to serve as cathodes with high electrical potentials and electrolyte salts which are alkali metal sulfur halides of the Formula $MZSX_2$. It is also contemplated that the electrolyte compositions can contain a mixture of salts, one of them being a salt of the formula $MZSX_2$, as exemplified by $LiAlSCl_2$ and the other being a salt of the formula $MZX_4$, as exemplified by $LiAlCl_4$.

As mentioned, the inorganic fluid oxyhalide solvents of the electrolyte compositions of the present invention comprise highly electropositive compounds with respect to lithium. Desirable compounds are thionyl chloride ($SOCl_2$), sulfurylchloride ($SO_2Cl_2$), thionyl bromide ($SOBr_2$), sulfuryl bromide ($SO_2Br_2$), phosphoryl chloride ($POCl_3$), and phosphoryl bromide ($POBr_3$). A preferred solvent is $SOCl_2$.

The electrolyte compositions of the present invention are prepared by (i) directly reacting, in a highly electropositive fluid oxyhalide such as in $SOCl_2$, alkali metal sulfides, exemplified by $Li_2S$, with Lewis acid metal halides, exemplified by $AlCl_3$; (ii) by reacting in $SOCl_2$ alkali metal halides exemplified by $LiCl$ with a Lewis acid metal sulfur halide, exemplified by $AlSCl$. In the first procedure, a reaction with 1 mole of the alkali metal sulfide, $M_2S$, and 1 mole of the Lewis acid halide, $ZX_3$, in the fluid oxyhalide solvent results in the formation of 1 mole of the alkali metal electrolyte salt, $MXSX_2$, and 1 mole of alkali metal halide. The alkali metal halide is filtered off and the fluid electrolyte thus obtained is used directly in an alkali metal anode cell where the fluid electrolyte composition serves as both a cathode depolarizer and fluid electrolyte. Also, in the first procedure, a reaction in $SOCl_2$ with one mole of the alkali metal sulfide, $M_2S$ and 2 moles of the Lewis acid halide, $ZX_3$, results in 1 mole of the alkali metal electrolyte salt $MZSX_2$ and 1 mole of the electrolyte salt, $MZX_4$. The electrolyte composition is directly used in the electrochemical cell serving both as a fluid electrolyte and a cathode depolarizer. In the second method of preparation, one mole of the alkali metal halide, $MX$, is treated with one mole of the Lewis acid sulfur halide, $ZSX$, in $SOCl_2$ to obtain one mole of the salt $MZSX_2$. The fluid electrolyte composition is directly used in the electrochemical cell, where it serves as both fluid electrolyte and cathode depolarizer.

The electrochemical cell where the electrolyte compositions of the present invention are used consists of an alkali metal anode, preferably Li, and a metal screen cathode current collector, having deposited on it an inert but electrically conducting material such as carbon black or graphite. The alkali metal anode and the cathode current collector are separated from internal electrical short-circuit by an insulating but electrolyte absorbing material such as a fiberglass mat. During discharge, the inorganic fluid halide in the electrolyte composition is reduced on the carbon present on the cathode current collector with the simultaneous oxidation of the alkali metal anode into the fluid electrolyte composition, resulting in electricity. The electrolyte salt is stable to electrochemical oxidation and reduction so that a major purpose of the electrolyte salt is to maintain proper ion transport, including the alkali metal cation, during discharge of the cell. The electrolyte composition of the present invention is advantageous in controlling the film growth rate on the alkali metal anode surface, particularly on Li in electrochemical cells with a Li metal anode.

DESCRIPTION OF PREFERRED EMBODIMENTS

The following examples enable those skilled in the art to more clearly understand and practice the present invention.

EXAMPLE I

An amount weighing 4.60 g (100 mmoles) of $Li_2S$ was added to 100 ml $SOCl_2$ containing 13.3 g (100 mmoles) of $AlCl_3$. The mixture was stirred for 16 hr. The precipitated LiCl was filtered off. The resulting electrolyte composition exhibited characteristic IR absorptions at 790 cm$^{-1}$ and 690 cm$^{-1}$, which are assigned to the Al—S and Al—Cl stretching vibrations of $LiAlSCl_2$. The solution had the conductivities listed in Table 1.

TABLE I

| CONDUCTIVITIES OF THE ELECTROLYTE COMPOSITION IN EXAMPLE I | |
|---|---|
| Temperature °C. | Conductivity ohm$^{-1}$ cm$^{-1}$ |
| 60 | $1.13 \times 10^{-2}$ |
| 42 | $1.12 \times 10^{-2}$ |
| 27 | $1.10 \times 10^{-2}$ |
| 0 | $9.53 \times 10^{-3}$ |
| −20 | $7.72 \times 10^{-3}$ |

TABLE I-continued

| CONDUCTIVITIES OF THE ELECTROLYTE COMPOSITION IN EXAMPLE I | |
|---|---|
| Temperature °C. | Conductivity ohm$^{-1}$ cm$^{-1}$ |
| −27 | $5.93 \times 10^{-3}$ |

EXAMPLE II

An amount weighing 2.3 g (50 mmoles) of $Li_2S$ was added to 100 ml $SOCl_2$ containing 13.3 g (100 mmoles) $AlCl_3$. The mixture was stirred for 16 hr. The resulting clear solution exhibited characteristic IR absorptions at 790 cm$^{-1}$ and 690 cm$^{-1}$. The solution exhibited the conductivities shown in Table II.

TABLE II

| CONDUCTIVITIES OF THE ELECTROLYTE COMPOSITION IN EXAMPLE II | |
|---|---|
| Temperature °C. | Conductivity ohm$^{-1}$ cm$^{-1}$ |
| 60 | $2.05 \times 10^{-2}$ |
| 40 | $1.87 \times 10^{-3}$ |
| 24 | $1.66 \times 10^{-2}$ |
| 0 | $1.27 \times 10^{-2}$ |
| −20 | $1.05 \times 10^{-2}$ |

EXAMPLE III

An amount weighing 0.84 g (19.7 mmoles) of LiCl was added with stirring to 20 ml $SOCl_2$ containing 1.88 g (19.8 mmoles) of AlSCl. The solution exhibited IR absorptions at 790 cm$^{-1}$ and 690 cm$^{-1}$, as observed in the solution in Example I. The electrolyte composition exhibited conductivities listed in Table III.

TABLE III

| CONDUCTIVITIES OF THE ELECTROLYTE COMPOSITION IN EXAMPLE III | |
|---|---|
| Temperature °C. | Conductivity ohm$^{-1}$ cm$^{-1}$ |
| 60 | $0.65 \times 10^{-2}$ |
| 40 | $0.66 \times 10^{-2}$ |
| 24 | $0.69 \times 10^{-2}$ |
| 0 | $0.57 \times 10^{-2}$ |
| −26 | $0.44 \times 10^{-2}$ |

EXAMPLE IV

An electrochemical cell was fabricated with Li metal anodes and cathode current collectors consisting of expanded nickel screens having deposited on them carbon black with teflon as bonding agent. The cell contained 4 anodes and 3 cathodes, parallelly arranged in the fashion Li/C/Li/C/Li/C/Li, to form an electrode package. Each cathode measured 3 cm×2 cm so that, counting both sides, each had an area of 12 cm$^2$. The anodes and cathodes were connected among their kinds to form the negative and positive electrical leads of the electrochemical cell. Each cathode and anode was separated by placing in between a mat of fiberglass. The electrode package was placed in a rectangular glass vial. The top of the glass vial was sealed by means of a polyethylene plastic disc having bores through which were taken the two cell terminals. The cell was filled with 4.5 ml of the electrolyte composition prepared in Example I. The cell exhibited an OCV of 3.68 V. Discharging the cell at 36 mA (1.0 mA/cm$^2$) resulted in a capacity of 980 mAh, with an average cell voltage of 3.4

V. The capacity was equivalent to a carbon utilization of 2.93 Ah/g carbon. These capacities compare favorably with that in Li/SOCl$_2$ cells containing LiAlCl$_4$.

EXAMPLE V

An electrochemical cell similar to the one described in Example IV was filled with 4.5 ml of the electrolyte composition prepared in Example II. The cell was discharged at 36 mA or 1.0 mA/cm$^2$. A capacity of 1000 mAh was obtained with an average cell voltage of 3.4 V. This capacity corresponded to 3.07 Ah/g carbon utilization.

EXAMPLE VI

An electrochemical cell similar to the one described in Example IV was filled with 4 ml of the electrolyte composition prepared in Example III. The cell was discharged at 36 mA or 1.0 mA/cm$^2$. A capacity of 970 mAh was obtained with an average cell voltage of 3.40 V. The capacity was equivalent to 4.04 Ah/g carbon utilization.

EXAMPLE VII

A cell similar to the one in Example VI was discharged at 4.0 mA/cm$^2$. The cell exhibited a capacity of 626 mAh at an average of 3.2 V. The capacity was equivalent to a carbon utilization of 2.1 Ah/g.

EXAMPLE VIII

Shiny pieces of lithium foil were added to a sample of the electrolyte composition prepared as in Example I and contained in a pyrex glass tube. The tube was evacuated, sealed, and heated at 71° C. for 10 days. The solution exhibited no color change. The lithium surface remained shiny with no apparent evidence of corrosion.

The results indicate that the electrolyte compositions of the present invention are useful as electrolytes in Li anode cells. The absence of discoloration and/or corrosion indicates that a protective coating of sufficient but minimal thickness was formed on the lithium surface with discoloration indicating a too thick coating and corrosion indicating the absence of coating.

EXAMPLE IX

Two electrochemical cells of the type described in Example IV containing 4.5 ml each of the electrolyte composition of the present invention prepared as described in Example I were stored at 70° C. for one week and 4 weeks respectively. At the end of the high temperature storage each cell was discharged at room temperature initially at 180 mA (5.0 mA/cm$^2$) and then at 18 mA (0.5 mA/cm$^2$). The cells exhibited no voltage depression to less than 2.0 V at the high current discharge of 5.0 mA/cm$^2$. The cell stored for 1 week exhibited a total capacity of 950 mAh, equivalent to 2.8 Ah/g carbon utilization. The cell stored for 4 weeks exhibited a capacity of 740 mAh, equivalent to 2.2 Ah/g carbon utilization. The results indicate a beneficial effect for the electrolyte composition of the present invention in comparison to the lithium-SOCl$_2$ cells containing LiAlCl$_4$ electrolyte salt in that, with the electrolyte composition of the present invention, the cell shows no voltage depression to less than 2.0 volts. The results also indicate that the electrolyte composition of the present invention is stable during high temperature storage.

EXAMPLE X

The rate of film growth on a fresh Li surface was measured as function of storage time of the Li in an electrolyte composition prepared as described in Example I. The film growth measuring technique involved an established method (E. Peled, J. Electrochem. Soc. 126, 2047 (1979)) utilizing a galvanostatic pulse technique in which the Li electrode capacitance was measured. It was found that in the electrolyte composition of the present invention, prepared as described in Example I, the film growth occurred at about half the rate of that found in SOCl$_2$ containing 1.8 molar LiAlCl$_4$. This indicates that a beneficial effect for an electrolyte composition of the present invention is being able to control beneficially the growth rate of undesirable film on the Li anode in an electrochemical cell having a Li anode.

I claim:

1. An electrolyte composition comprising
 an electrolyte salt having the formula MZSX$_2$, wherein
 M is an alkali metal,
 Z is selected from the group consisting of boron, aluminum, gallium, indium, and thallium, and
 X is a halogen,
 dissolved in a fluid oxyhalide solvent electropositive with respect to lithium.

2. The electrolyte composition of claim 1 wherein said oxyhalide solvent is selected from the group consisting of SOCl$_2$, SO$_2$Cl$_2$, SOBr$_2$, SO$_2$Br$_2$, POCl$_3$, and POBr$_3$.

3. The electrolyte composition of claim 2 wherein said electrolyte salt has the formula LiAlSCl$_2$, and said fluid oxyhalide solvent is SOCl$_2$.

4. The electrolyte composition of claim 1, further comprising a compound having the formula MZX$_4$, wherein
 M is an alkali metal,
 Z is selected from the group consisting of boron, aluminum, gallium, indium, and thallium, and
 X is a halogen.

5. The electrolyte composition of claim 4, wherein said compound having the formula MZSX$_2$ is LiAlSCl$_2$, and
 said compound having the formula MZX$_4$ is LiAlCl$_4$.

* * * * *